United States Patent
Ray et al.

(10) Patent No.: US 8,234,211 B2
(45) Date of Patent: Jul. 31, 2012

(54) DIGITAL LIEN SERVICE

(75) Inventors: Randall L. Ray, Troy, MI (US); Peter D. Kochevar, Vancouver (CA)

(73) Assignee: Copper Range, Inc., Troy, MI (US)

( * ) Notice: Subject to any disclaimer, the term of this patent is extended or adjusted under 35 U.S.C. 154(b) by 127 days.

(21) Appl. No.: 11/445,873

(22) Filed: Jun. 2, 2006

(65) Prior Publication Data

US 2006/0277516 A1      Dec. 7, 2006

Related U.S. Application Data

(60) Provisional application No. 60/686,702, filed on Jun. 2, 2005.

(51) Int. Cl.
*G06Q 40/00*      (2012.01)
(52) U.S. Cl. .................. 705/38; 705/1; 705/2; 705/37; 705/39; 705/52; 707/100; 713/170; 716/12
(58) Field of Classification Search .................. 705/1, 2, 705/37, 39, 52; 707/100; 713/170; 716/12
See application file for complete search history.

(56) References Cited

U.S. PATENT DOCUMENTS

| | | | |
|---|---|---|---|
| 6,259,354 B1 | 7/2001 | Underwood | |
| 6,393,410 B1 * | 5/2002 | Thompson | 705/37 |
| 6,959,382 B1 * | 10/2005 | Kinnis et al. | 713/170 |
| 2002/0107703 A1 * | 8/2002 | Feinberg et al. | 705/2 |
| 2004/0024605 A1 * | 2/2004 | Morris | 705/1 |
| 2004/0215633 A1 * | 10/2004 | Harris | 707/100 |
| 2005/0187863 A1 * | 8/2005 | Whinery et al. | 705/39 |
| 2005/0216400 A1 * | 9/2005 | Doyle et al. | 705/39 |
| 2005/0289051 A1 * | 12/2005 | Allin et al. | 705/40 |
| 2006/0064375 A1 | 3/2006 | Campagna et al. | |
| 2006/0173706 A1 | 8/2006 | Allin et al. | |
| 2006/0271397 A1 | 11/2006 | Allin et al. | |
| 2006/0271477 A1 | 11/2006 | Allin et al. | |
| 2006/0271478 A1 | 11/2006 | Allin et al. | |
| 2006/0277516 A1 * | 12/2006 | Ray | 716/12 |
| 2007/0078771 A1 * | 4/2007 | Allin et al. | 705/52 |

* cited by examiner

*Primary Examiner* — James Trammell
*Assistant Examiner* — Sanjeev Malhotra
(74) *Attorney, Agent, or Firm* — Patent Procurement Services

(57) ABSTRACT

A process of digital electronic lien management is provided. Form data is stored in a first electronic database. A user adds lien input data in a second electronic database related to a specific construction lien project. A user then generates at least one lien form through insertion of the lien input data into the form data. The resultant form is transmitted to a recipient, who digitally modifies the form to create a modified version and electronically reconveys the modified version to the user.

19 Claims, 7 Drawing Sheets

DIGITAL LIEN SERVICE

RELATED APPLICATION

This application claims priority to U.S. Provisional Application Ser. No. 60/686,702 filed Jun. 2, 2005, which is incorporated herein by reference.

FIELD OF THE INVENTION

The present invention relates to an all-electronic, paperless system for management and filing of lien documents, in particular for management and filing of lien documents often found in use in the construction industry.

BACKGROUND OF THE INVENTION

A construction or mechanics lien is a legal mechanism for contractors to protect themselves when dealing with contractees. A lien is a hold on real property such that an owner's title to the property becomes constrained. This constraint must be removed before the owner can claim clear title to the property. Because a contractor usually provides a service prior to actually getting paid for that service, a contractor needs to have some way to seek redress should a contractee withhold payment for whatever reason.

Most states in the United States have construction lien laws in place that protect contractors when performing work on the behalf of a contractee. These laws also provide protection for contractees as well. Most construction lien laws prescribe procedures intended to prevent disputes from occurring that may lead to liens on property in addition to actually placing and removing liens. Underlying these procedures are a series of legal forms that must be filled out and then filed with appropriate legal authorities. Many of the legal forms intended to prevent disputes are filled out periodically during a job and are usually a requirement for contractors to be paid by contractees. These forms, among other things, document that a project's finances are being properly managed and they document the physical progress of contracted work.

Today, most of the documentation mandated by construction lien laws is in the form of paper. These forms must be signed by contractors and contractees, many times in the presence of notary publics. Therefore, paper lien documents usually must be physically transported from one location to another, often by postal mail or courier, during the process of signing and filing. Consequently, this entire enterprise tends to be slow and costly; in fact, often it is the case that work continues on a project before all of the construction lien documentation has been brought up to date thus creating windows of vulnerability to the kind of litigation that construction lien laws were intended to alleviate in the first place.

SUMMARY OF THE INVENTION

A process of digital electronic lien management is provided. Form data is stored in a first electronic database. A user adds lien input data in a second electronic database related to a specific construction lien project. A user then generates at least one lien form through insertion of the lien input data into the form data. The resultant form is transmitted to a recipient, who digitally modifies the form to create a modified version and electronically reconveys the modified version to the user.

DETAILED DESCRIPTION OF THE INVENTION

Figure 1:
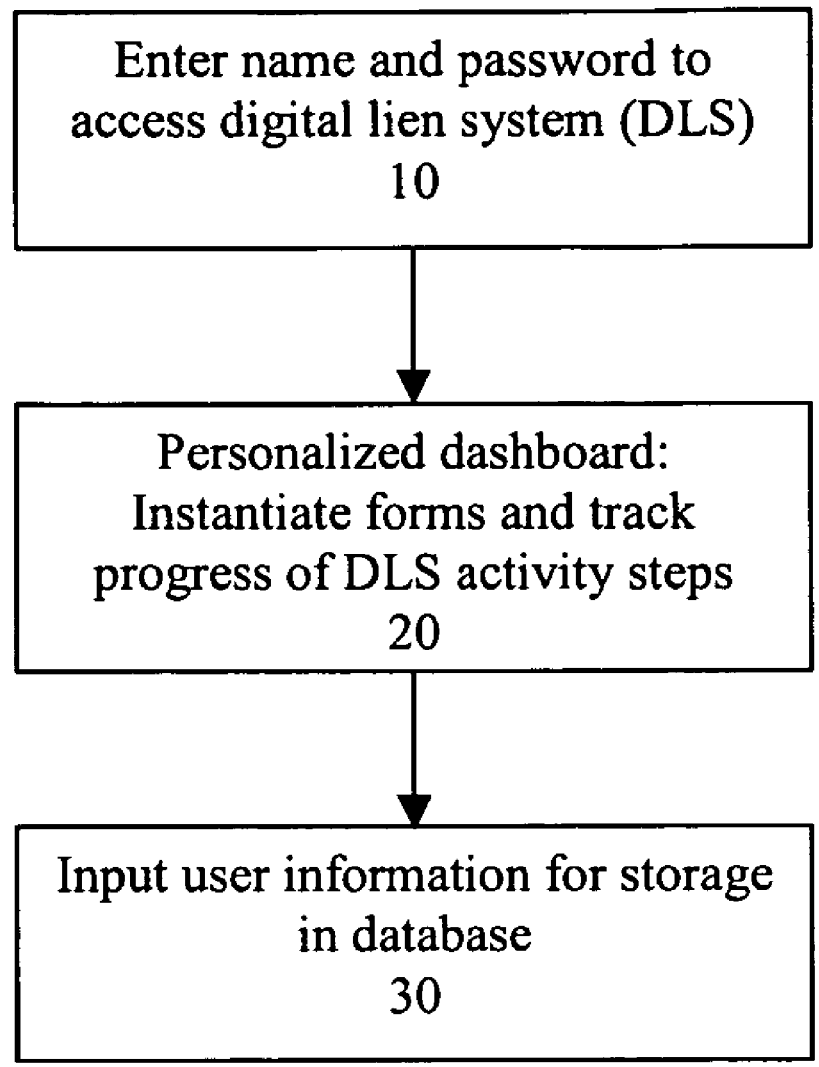
FIG. 1 is a schematic block diagram of an inventive system operating in an Internet space.

The present invention is a digital lien service (DLS) that is an all-electronic means for filling out, signing, notarizing, routing, and filing all of the documentation required by construction lien laws. The inventive process is considerably faster and more efficient than the predominately paper-based process it is meant to replace thus reducing legal vulnerabilities that arise when the documentation lags the work performed. The greater throughput arises from the sharp reduction in multiple data entry when information entered on one form can be carried over to related forms, and from the elimination of physical transport of the documentation as it is routed to the various parties involved in a construction process. Significant cost savings also arise because less man-hours are required to manage and transport the documentation. In addition, there are intangible cost savings in using the DLS when reasons to litigate are diminished because lien documentation can be more readily stored, managed and accessed, and higher throughput reduces the windows of legal vulnerability when paperwork lags the work performed.

The present invention uses a system of computer-based forms that are routed from one party to another using a computer network. Forms are signed and notarized using digital signatures, and signed and notarized forms are filed by placement into a computer database maintained by some appropriate legal authority or its agents.

As each governmental entity has different construction lien laws and consequently different procedures for complying with the laws, the exact nature of the forms is dependent on where the contracted work is to take place and/or where the legal place of business of the contractee is. In the alternative, the exact nature of forms is dependent on an agreed "place of contracting", wherein the parties would use the construction lien laws of an agreed upon place or jurisdiction. The forms and routing procedures can be selected automatically by the DLS system based on location information collected from an administrative user of the system who is responsible for initializing a new construction project.

All users of the DLS are granted access to the system by system administrators, and users would have to present evidence of their right to use the system before actually doing work. The type of level of access granted to users may differ based on the kinds of roles users would be assigned by system administrators. For instance, a representative of a contractee might be granted the right to create a new construction project and then designate what other individuals would participate in the lien process for that project and in what role. A contractor might be allowed to only instantiate certain types of lien forms at specific times during a project, and other contractee representatives might only have approval authority over certain types of lien forms. That is, lien forms are routed to them for review and signature in keeping with contractee internal business practices, but their signatures are not required as a legal component of the lien process mandated by a legal authority.

Once a project is set up within the DLS, some lien forms are instantiated by representatives of the contractee while other lien forms are instantiated by representatives of contractors and/or subcontractors. Some forms might be instantiated only once for a project, say a contractee's or client's Notice of Commencement prior to contractors actually starting work on a project. Other forms might be instantiated at numerous times during the course of a project as would be the case with Partial Lien Waivers or Sworn Statements that contractors submit to contractees when seeking partial payment for work performed to date.

At times during a lien process contractors may serve as contractees themselves, as would be the case when they have subcontractors. The DLS is capable of mediating lien transactions between contractors and subcontractors, subcontractors and their subcontractors, and so on. Signed and notarized lien forms at one level in the contractor-subcontractor hierarchy structure may be required as attachments to lien forms at other levels as required by an appropriate legal authority or by the internal business practices of the parties involved. The DLS handles the collection and routing of lien forms among all parties involved in a project.

Lien forms within the DLS may be grouped together to form "bundles". For the purpose of the present invention, the term "bundles" refers to a collection of forms that are somehow related. For instance, a lien process might require that a contractor submit a Sworn Statement, a Partial Lien Waiver, and Partial Lien Waivers for any subcontractors they may have each month. All of the various forms would be bundled together to make one monthly submission, a kind of multi-page "super" form.

In general, electronic lien forms displayed on a computer screen may or may not have a direct analog with the actual lien forms that get filed with a legal authority. This is because of the redundancy of information that exists in many lien form bundles. The forms displayed on the computer screen that are part of the DLS are designed to collect the minimum amount of information needed to fill out the lien forms that actually get filed.

The DLS is customizable by system administrators and users not only to accommodate various lien procedures that differ from one governmental entity to another, but it is also customizable to integrate with the business practices of the parties using the DLS. For instance, contractees may have separate forms not required by lien law that facilitate billing and payment procedures that relate to Sworn Statements and Lien Waivers of a lien process. Therefore, some forms displayed within the DLS correspond to actual legal documents required by lien law while other forms do not, they being present merely to facilitate internal business practices of DLS users.

All forms in the DLS are stored and organized electronically for easy access by all parties involved in the lien process before, during, and after a project has completed. Because all forms are stored electronically, information can be automatically carried forward by the DLS to those forms that have some type of link to forms that have already been filled out and filed. For instance, information in a Sworn Statement for one month can be used to fill out, partly or wholly, a Partial Lien Waiver and Sworn Statement for the following month. Forms from which information is carried forward need not be only lien forms required by a lien process but they can be auxiliary forms used in the business practices of parties using the DLS.

The online access to electronic forms within the DLS is facilitated by a range of search features that authorized DLS users may utilize. A search for a form or form bundle might be made by a user based on criteria such as whether or not forms have been filed, viewed or signed by some group of individuals, or whether there exists any forms requiring some type of action by a user such as their signature. Forms within the DLS might be stored in such a way as to facilitate the types of searches that users might typically make.

An important aspect of the DLS is the routing of forms to appropriate parties participating in a lien process. This routing might be automatic based on the type of form being used and who must sign it, and/or the routing might be specified manually by a user when they instantiate a form. The DLS provides a means for users to check on the status of forms or form bundles as the forms are processed according to a routing procedure. In addition, alert messages can be sent automatically by the DLS to appropriate individuals when some action is required of them as the forms are routed. In the alternative, routing may be comprised of the transmitting of forms to users, for example by email.

In addition to signatures on various forms required by a lien procedure, parties involved in a process might also require review and approval by other individuals in their organizations. These approvals are not required by legal authorities as part of a lien process but are the consequences of voluntary business practices of contractees and/or contractors. The routing procedures within the DLS are flexible enough to account for these optional approval signatures.

As forms are being routed by the DLS, signers and/or approvers may detect errors in or have questions on certain forms, in which case the regular routing may be altered. With errors, the DLS provides a facility for users to "back out" of any forms or form bundles. In addition, the DLS provides an annotation system so that users can point out and comment on errors directly on forms, and they can question or comment on any items appearing in the forms. Annotated forms move back upstream in the routing procedure until errors are corrected or questions answered by an appropriate DLS user, usually the person who instantiated the form. In the alternative, the DLS can provide a means for a user to alter or correct a form and then execute a conditional signature on the form, said condition being satisfied if an appropriate user higher in the hierarchy structure approves the alteration or correction. Any erroneous forms are effectively deleted by the DLS, subject to approval by all involved parties, and corrected forms instantiated and routed in their place.

As forms are being routed, all actions on them are recorded and time stamped to provide a complete history of the creation and evolution of the forms. In a sense, the DLS itself provides "witness" of any signings and as such serves as an electronic notary for those forms that require notarization by appropriate legal authorities with whom the forms will be filed. All signatures that users provide on the forms within the DLS are in the form of digital signatures of the kind that satisfies the requirements of the digital signature laws of the governmental entities where the DLS is used.

The DLS eventually files all lien forms that have been properly signed and approved. Completed forms may remain within the DLS, in which case appropriate legal authorities are alerted to their presence and are told how they may be accessed and/or, completed forms may be moved to electronic systems outside of the DLS that are maintained by appropriate legal authorities or their agents.

One embodiment of the DLS uses the World Wide Web as the basic substrate for creating, routing, and signing construction lien forms for a construction project. The features of the DLS might be offered as a service by an application service provider (ASP) and users would interact with the DLS through any Web browser. In the alternative, the DLS can be offered as a service by a user such as a contractee, contractor or subcontractor, wherein said user maintains the DLS for the parties related to a project.

Referring now to the attached FIG. 1, prior to gaining access to the DLS, users would have to enter a login name and password 10 that was assigned to them when their DLS accounts were set up by their ASP. Upon logging in, an authorized user would see their own personalized "dashboard" from which they can instantiate any lien forms, track forms' progress as they are routed to appropriate parties, examine forms, sign or approve them, search for forms, etc. 20. The types of options available to a user would depend on the role they were assigned by their DLS administrator.

Web pages viewed by DLS users would be served by a Web server operated by an ASP as a result of requests made by users using their Web browsers. DLS user input information is stored in a database 30 connected to the Web server. The database 30 would be a database managed by a database management system where all information input into forms by DLS users would be stored. The database would also store any form templates, routing information, project descriptions, digital signatures, and any other attendant information needed to operate the DLS. The Web server uses the information in the database to craft Web pages to send to users' Web browsers.

Figure 2:
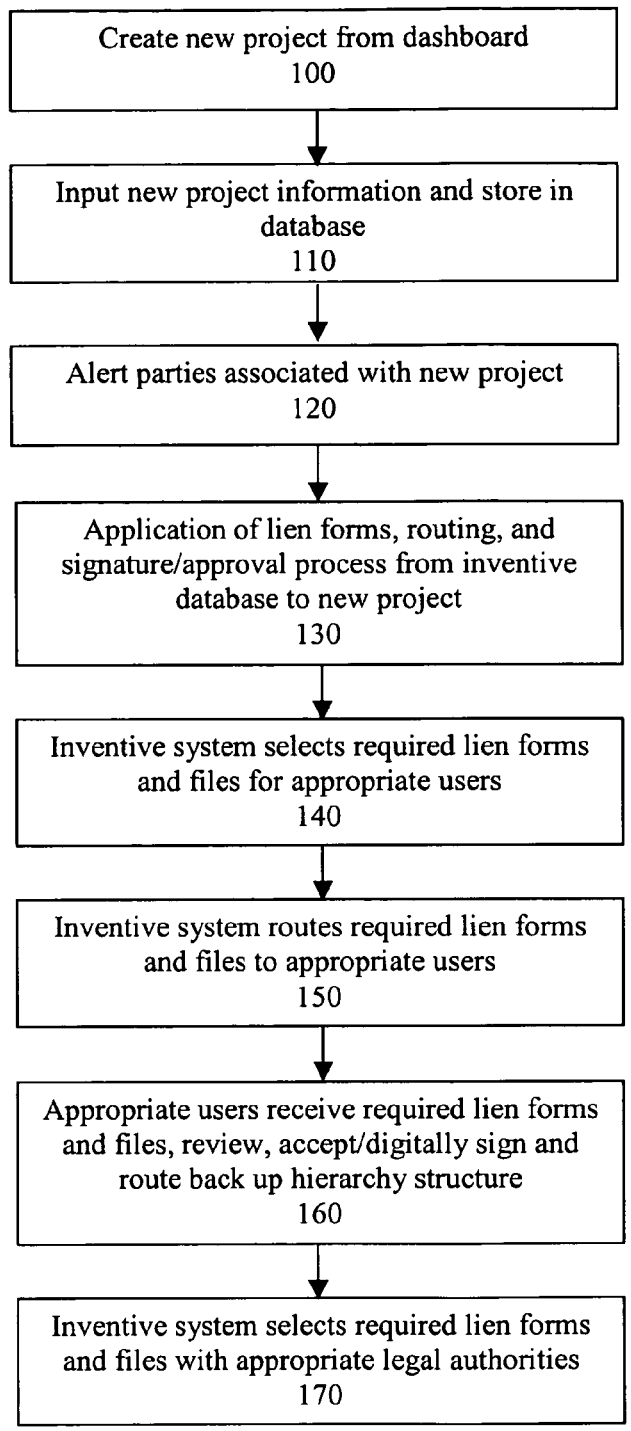
FIG. 2 is a schematic block diagram of the steps in initiating a new lien project according to the present invention.

An inventive lien process for a particular new project is detailed with respect to FIG. 2 and begins when a user with an administrator role representing a contractee creates a new project from their dashboard 100. The new project requires input 110 such as the name and physical location of the project, the name and contact information for the contractee, the name and contact information for the contractor, and the names and contact information for any approvers of documentation created and routed within the DLS for the project. All individuals associated with the new project are sent automatically by the DLS e-mail messages alerting them to the fact that they are now included in a new project and explaining how they may participate in the lien process for the project 120.

The types of lien forms, auxiliary forms, routing, and the signature and approval process is set up beforehand by the ASP to conform to appropriate lien laws and business practices of the contractee. Based on the location of the new project, the legal residence of the contractee and/or the agreed upon place of contracting, the DLS selects the required lien forms at 140 and then routes them to the appropriate users identified by the contractee at 150. Once the appropriate users receive the required lien forms and files, review them and execute their approval of said forms using a digital signature, the DLS routes the lien forms and files back up the hierarchy structure to the appropriate user at 160 and selects the required lien forms and files them with the appropriate legal authorities at 170.

The act of filing completed lien forms might be that of using an Internet-based file transfer system, such as FTP, to send electronic facsimiles of the regular paper-based lien documents, say in PDF, to a server machine operated by the legal authority or its agent. Or, the completed lien forms might be sent to the legal authority or its agent encoded in some standardized XML-based format via some type of Web-based services system.

Figure 3:
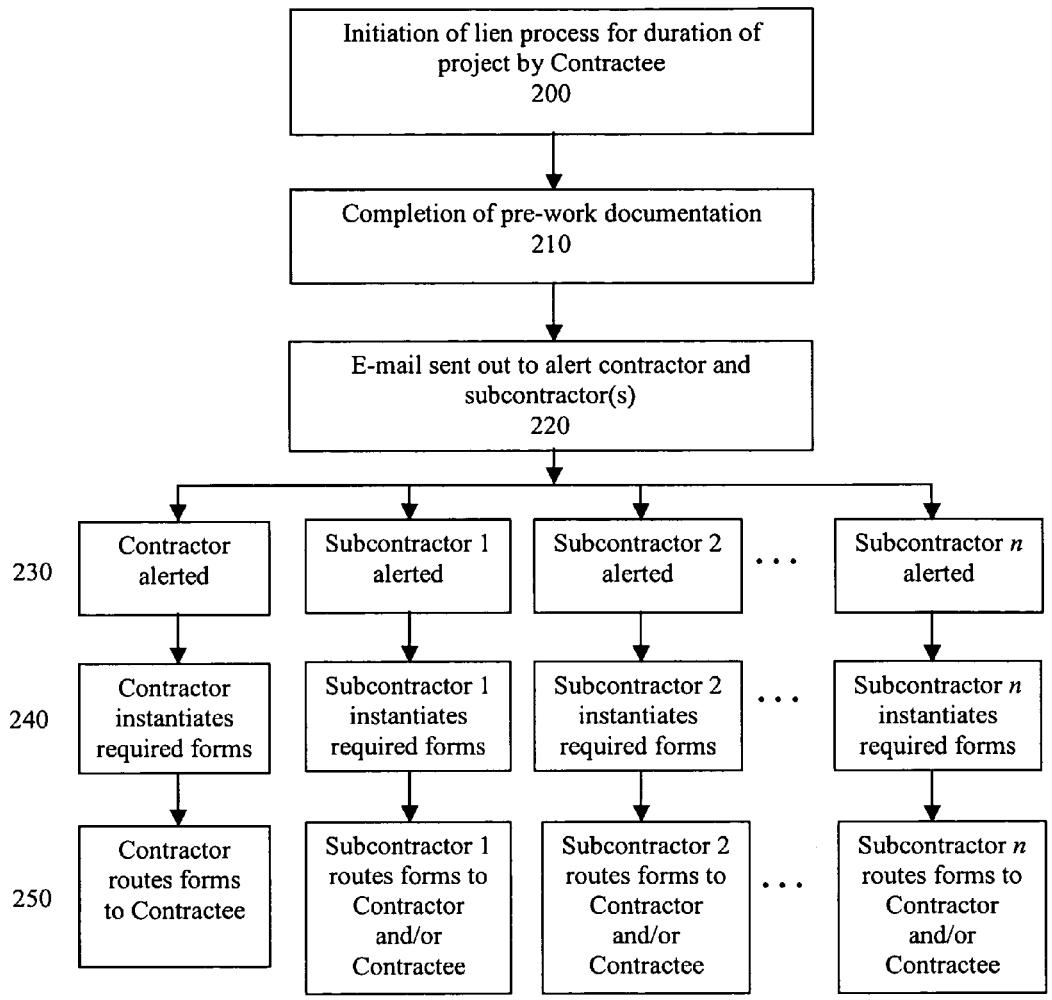
FIG. 3 is a schematic block diagram of the steps to initiate the lien process for the duration of the project.

Referring to FIG. 3, to initiate the whole lien process for the duration of the project 200, a contractee may have to fill out, sign, and file certain documentation prior to any work actually being performed by the contractor or service provider, for instance, a Notice of Commencement. Once any pre-work documentation is completed at 210, the contractor, and any subcontractors they may have, are all alerted to that fact via e-mail messages sent automatically by the DLS at 220. Once the contractor receives the alert e-mail message at step 230, it is now free to instantiate any forms that may be required of them by the appropriate legal authorities and/or the contractee at step 240, and route said forms back to the contractee at 250. In addition, once any subcontractors receive the alert e-mail message at step 230, they are now free to instantiate any forms that may be required and route said forms back to the contractee and/or contractor at 250. The DLS automatically keeps track of which forms were sent by which user and any special needs, dates, etc. noted by a given user, if any.

Once a month or any time period selected by an appropriate user, for the duration of the project, a contractor might be required to submit a form bundle to the contractee that consists of a number of forms, for example a Sworn Statement, a Partial Lien Waiver for the contractor, Partial Lien Waivers for each direct subcontractor to the contractor, and a Purchase Order Detail Summary. All of the forms in the bundle for the present example are required by the lien laws of the governmental entity where the work for the project is taking place, except for the Purchase Order Detail Summary form. That form is an auxiliary form that the contractee requires to help facilitate the billing and payment process between the contractor and contractee.

Figure 4A:
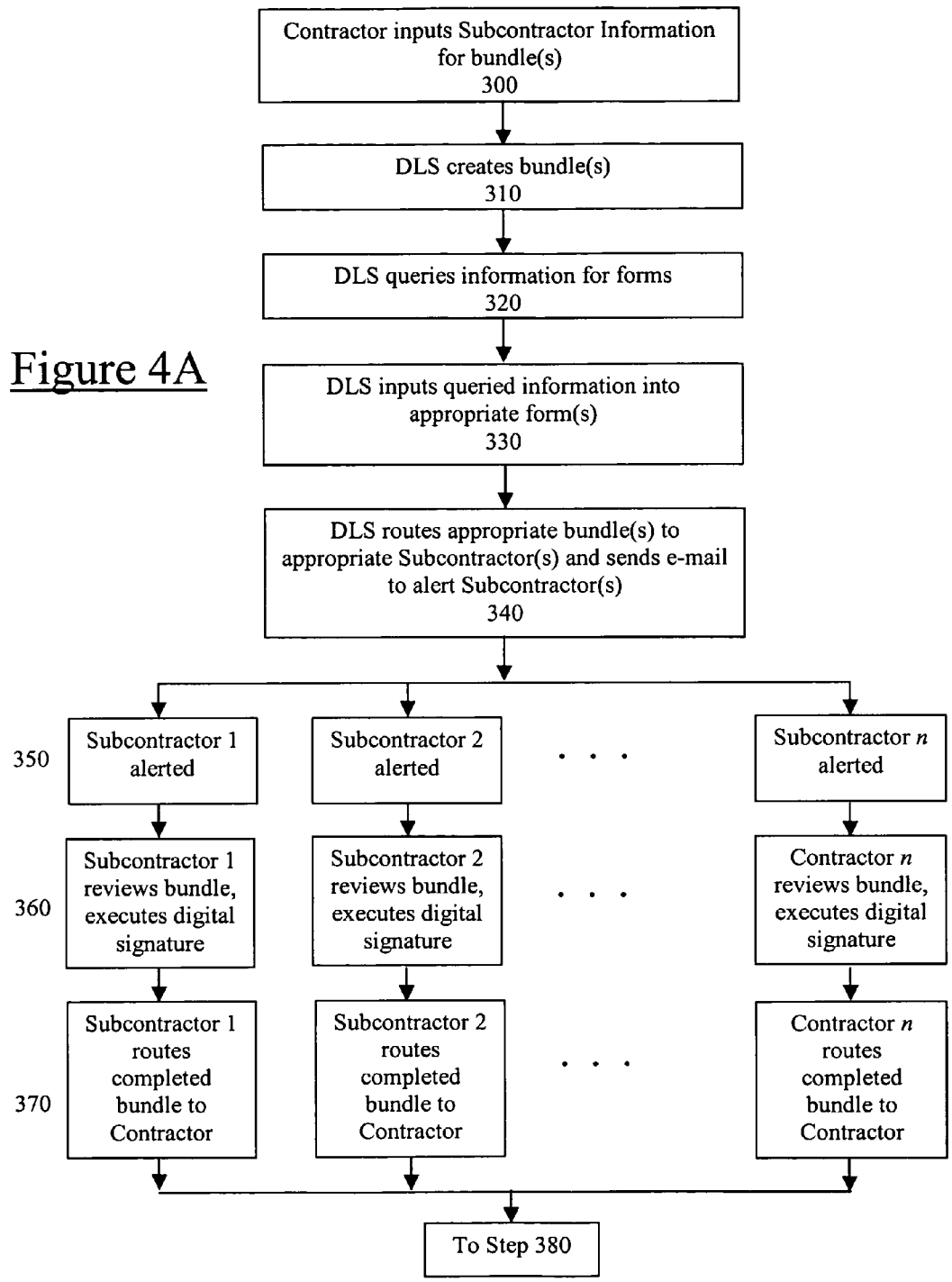
FIG. 4A is a schematic block diagram of the steps for a contractor to instantiate a form bundle.
Figure 4B:
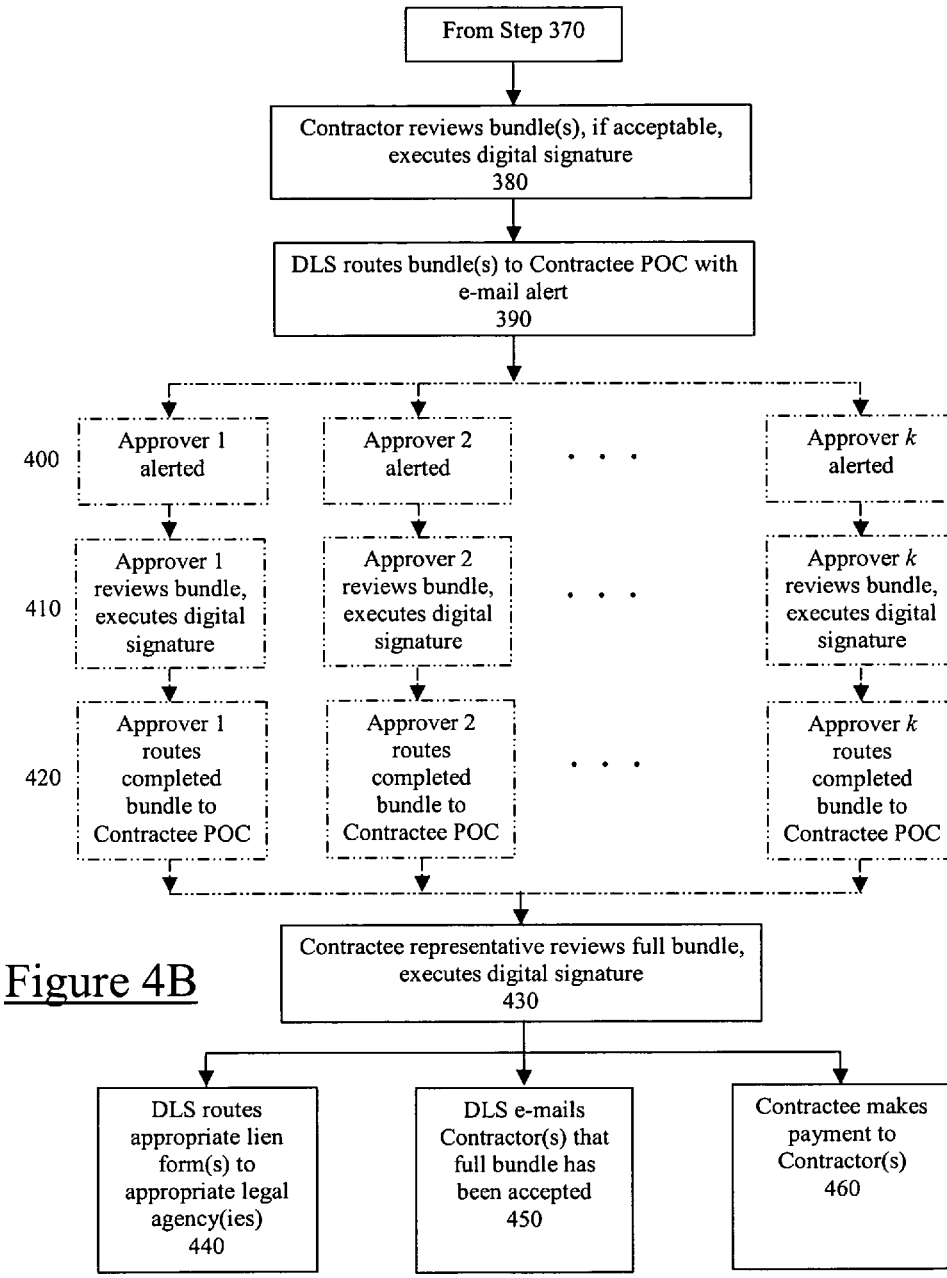
FIG. 4B is a continuation of FIG. 4A.

The contractor instantiates a form bundle from their dashboard within the DLS (FIGS. 4A and 4B). The form bundle is created by the DLS at 310 based on information input by the contractor in a set of forms displayed within the contractor's Web browser at 300. The DLS queries for the minimal amount of information required to complete, for example the Sworn Statement, Partial Lien Waivers, and the Purchase Order Detail Summary at 320 and do not necessarily correspond directly with those documents. Information already known to the DLS about the given project is used whenever possible to minimize the amount of information the contractor must input at 330. In particular, information contained in the previous month's bundle, if not the first bundle, is carried forward to aid in completing the current bundle.

When a contractor first instantiates a bundle, Partial Lien Waivers, along with other appropriate forms dictated by the contractee or contractor, are automatically created for each of the contractor's direct subcontractors. Assuming there are "n" subcontractors, the Partial Lien Waivers and other forms are then routed to the subcontractors at 340 for their digital signature, which is executed within the DLS. Each subcontractor is automatically sent an e-mail message at 340 in order to alert said subcontractor that a new Partial Lien Waiver and other possible forms have been created and awaits their signature. Once alerted, a given subcontractor reviews its respective forms, and if acceptable executes a digital signature at 360 and then submits the forms back to the contractor at 370. The contractor then reviews the bundles from the subcontractors and, if acceptable, executes a digital signature at 380 for the full bundle (FIG. 4B). The contractor cannot digitally sign the full bundle until all subcontractor Partial Lien Waivers are digitally signed. In the alternative, the contractor can digitally sign the full bundle without all of the signatures from the subcontractors if express permission or authority is given by the contractee to the contractor.

When all subcontractor Partial Lien Waivers and other forms are signed and the contractor digitally signs the full form bundle at 380, the DLS routes the full bundle to a contractee point of contact (POC) at 390. If approvers, for example various representatives within a company, are required to sign the bundle, the DLS affords the opportunity for the full bundle to be automatically routed to said approvers along with an alert email message. In the alternative, the DLS can be configured such that the contractee POC determines if approvers are required and to whom the full bundle should be routed.

Assuming approvers are required, FIG. 4B shows in phantom at steps 400, 410 and 420, that the approvers would be alerted by email, would reviewer and sign the bundle, and then route the bundle back to the contractee POC. In the alternative, the approvers could route the bundle to some other contractee representative. If approvers are not required, then the contractee POC routes the full bundle directly to a contractee representative at 430 for review. It is important to note that the contractee POC and the contractee representative may be the same user, thereby allowing steps 390 and 430 to collapse within one another.

Once all the approvers have given their approval the bundle is then routed to the contractee representative at 430 who formally accepts the bundle on behalf of the contractee by digitally signing the bundle and routing said bundle to any appropriate legal agency at 440, at which case the contractor is informed via an e-mail message of that fact at 450. Furthermore, payment to the contractor is initiated at 460. If the contractor, approvers or contractee do not accept the partial lien waivers or forms that have been routed to them, a digital signature is not executed and the necessary individual or individuals are contacted in order to address the reason or reasons for unacceptability.

Whenever a DLS user logs in, their dashboard automatically displays an alert for each lien document that requires their action, such as signing with a digital signature. Also from the dashboard, a user can track the history of any lien documentation to which they are a party for all current projects and all projects that have been completed. In addition, a user can query for a single document or groups of documents based on a wide variety of criteria using a dashboard search facility within the DLS.

Figure 5A:
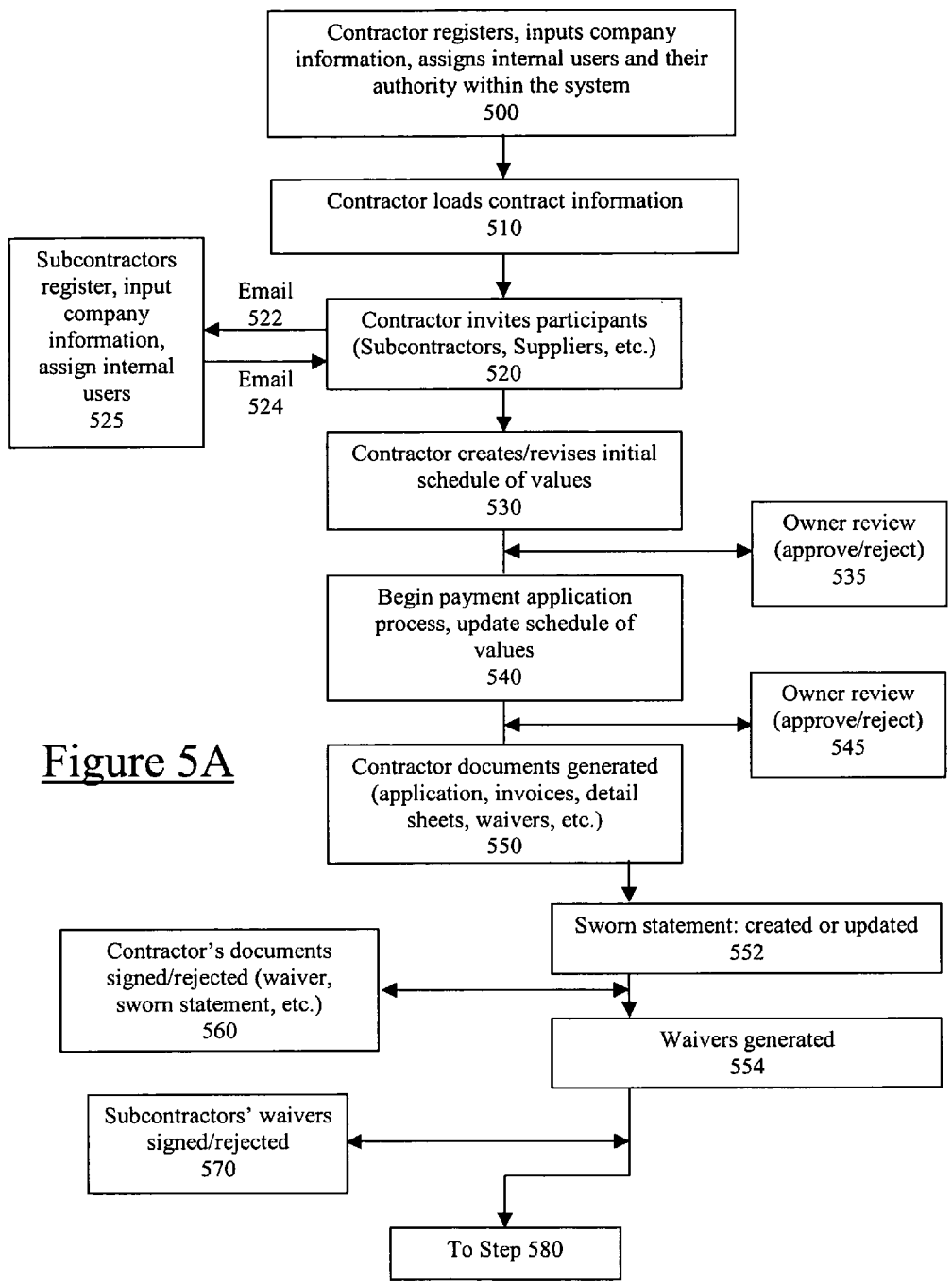
FIG. 5A is a schematic block diagram of the digital lien system workflow engine.

FIG. 5 shows a number of steps representative of a DLS workflow engine for the present invention. Initially, a contractor registers a project within the DLS at 500 and inputs company information, assigns internal users, etc. Next, at 510 the contractor loads additional information regarding the contract itself. At 520 the contractor invites participants illustratively including subcontractors, suppliers and bond companies to participate in the contract by sending an e-mail 522 to said participants. Upon receiving said e-mail the parties register and input pertinent information into the DLS at 525 by either replying via e-mail 524 to the contractor or through a Web page form on the DLS site. Upon receiving said pertinent information from 525, the contractor creates and/or revises the initial schedule of values at 530. Next, the owner, also known as the contractee for the purposes of the present invention, reviews the newly created and/or revised initial schedule of values at 535 and either approves or rejects. If the owner rejects said values, the schedule of values is routed back up to 520 wherein the contractor can invite participants to adjust said pertinent information at 525 or enter negotiations with said owner. Assuming the owner approves the initial schedule of values at 535, a payment application process is initiated at 540. In addition an updated schedule of values is created at 540. At 545 the owner again reviews the payment application process and updates any updated schedule of values. If the owner rejects said application process and/or the updated schedule of values, said process and values are routed back to 530 for revision and/or negotiation with the contractor.

Figure 5B:
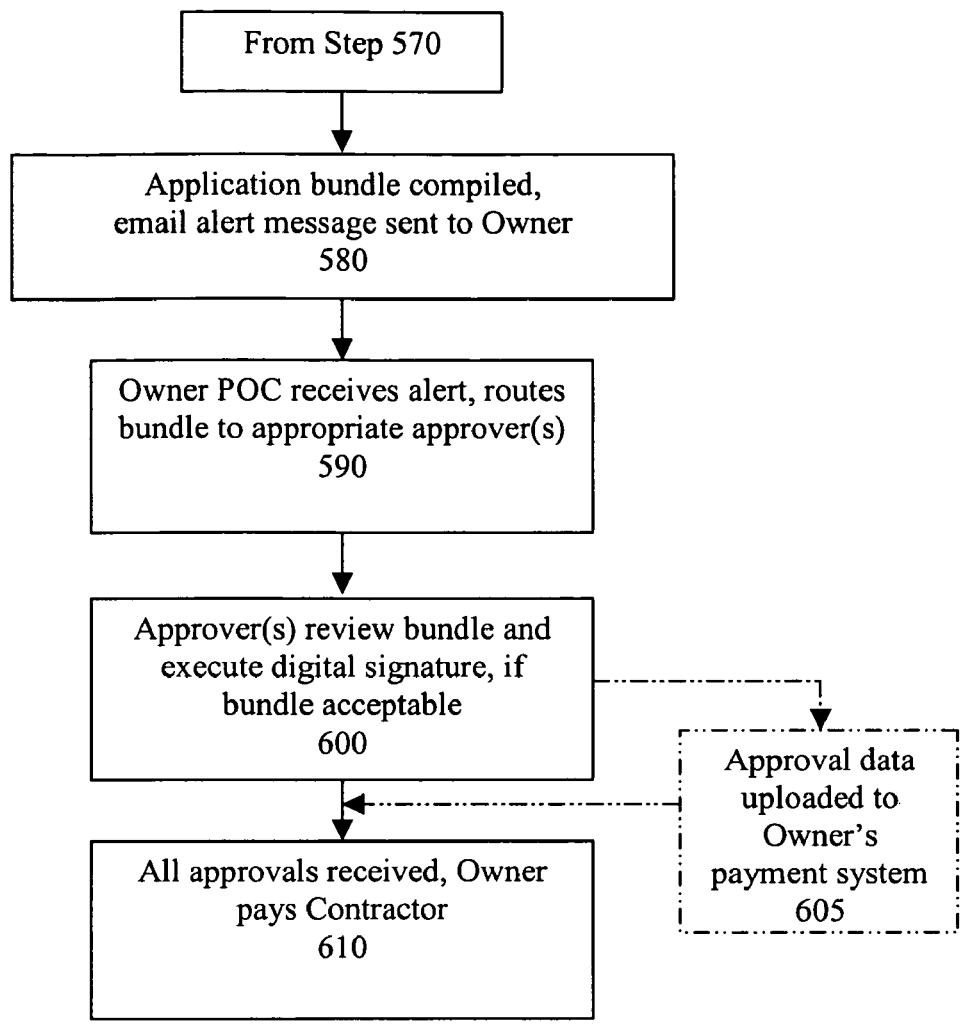
FIG. 5B is a continuation of FIG. 5A.

Assuming the owner approves the payment application process and the updated schedule of values at 545, the contractor's documents are generated at 550. Such documents illustratively include applications, invoices, detail sheets and waivers. At 552 a sworn statement is created or updated wherein the contractor swears payment has been made to appropriate subcontractors and the contractor either signs or rejects the compiled forms at 560. The subcontractor waivers or partial waivers are generated at 554 with the appropriate subcontractors either agreeing and executing a digital signature or rejecting at 570. Assuming the contractor and subcontractors execute the necessary digital signatures at 560 and 570, the application bundle is compiled and an e-mail alert message is sent to the owner at 580 (FIG. 5B).

Upon receiving the e-mail alert message, an owner point of contact subsequently routes the compiled bundle to any appropriate approvers required by the DLS at 590. Once the appropriate approvers review the bundle and execute their digital signature at 600, assuming the bundle is acceptable, all approvals are received and the owner pays the contractor at 610. In the alternative, the approval data from said approvers executing digital signatures onto said bundle is uploaded to the owner's payment system as shown in phantom at 605. Once said approval data is uploaded to the owner's payment system, the owner pays the contractor at 610. It is important to note that a given lien form or bundle can be maintained by the DLS on a particular website with access allowed only to those with authority to review and execute digital signatures on said forms. In this circumstance e-mails would be used as detailed above in order to alert the appropriate personnel when a particular form and/or bundle is ready for their attention. In the alternative, the present invention affords for the actual lien forms and/or bundles to be transmitted, for example by email, to the appropriate individuals.

The invention is not restricted to the illustrative examples described above. The examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

The invention claimed is:

1. A process for digital electronic lien management comprising:
    storing form data in a first electronic database;
    a contractee creating a new project from a dashboard, the contractee having contractee information and contractor information associated with the new project, the new project being a construction lien law documentation package for a property controlled by the contractee;
    inputting the contractee information and the contractor information into a second electronic database as lien input data;
    storing the lien input data in the second electronic database;
    digital lien service software operating on a computer generating at least one form using the form data and the input data;
    electronically transmitting the at least one form to at least one contractor individual associated with the new project;
    electronically receiving a modified version of the at least one form from the at least one contractor individual in the first database or the second database with digital signatures of the at least one contractor individual so as to complete the digital electronic lien management process;
    the software selecting required legal lien forms from the modified version of the at least one form for filing with a legal agency; and the software initiating full or partial payments to said at least one contractor individual in response to full or partial lien waivers.

2. The process of claim 1 wherein said first database and said second database are the same database.

3. The process of claim 1 wherein the contractor individual digitally signs said at least one form to yield said modified version.

4. The process of claim 1 wherein said form data is selected from the group consisting of lien forms, sworn statement forms, lien waiver forms, partial waiver forms initial schedule of values, and business forms.

5. The process of claim 1 wherein said input data is selected from the group consisting of project information, contractee information, contractor information and subcontractor information.

6. The process of claim 1 further comprising a hierarchy structure, said structure affording to the at least one contractor individual of the digital electronic lien management and filing process a different level of access to the process than the contractee.

7. The process of claim 1 further comprising searching one of said first database or said second database to afford the selection of at least one form, the selection determined from the group consisting of whether the form has been filed, whether the form has been viewed, whether the form has been signed, whether the form is related to said project, whether the form is related to a subproject of the project and whether the form is related to the contractee.

8. The process of claim 1 further comprising a routing to transmit said at least one form to at least one contractor individual.

9. The process of claim 8 wherein the transmitting of said at least one form is automatically determined by said software based on said input data.

10. The process of claim 8 wherein said routing further comprises an alert message to the at least one contractor individual related to transmission of said at least one form.

11. The process of claim 1 further comprising an annotation system, said annotation system affording the at least one contractor individual ability to note and comment on said at least one form and to transmit said at least one form with notes or comments to the contractee.

12. The process of claim 11 wherein said annotation system affords for deletion of said at least one form.

13. The process of claim 11 wherein said annotation system affords for insertion of at least one form.

14. The process of claim 1 further comprising recording the electronic storage of said at least one form in said first database or said second database.

15. The process of claim 14 further comprising time stamping of said at least one form upon transmitting of said form to the at least one contractor individual.

16. The process of claim 1 further comprising filing said selected required legal lien forms with said legal agency.

17. The process of claim 1 further comprising electronically moving completed forms to an electronic system outside the digital electronic lien management process.

18. The process of claim 1 wherein the inputted lien data comprises a name and physical location of the new project, a name and contact information for the contractee, a name and contact information for the at least one contractor, and any names and contact information for any approvers of the forms and documentation created and routed within the digital lien service (DLS) for the new project.

19. The process of claim 1 wherein said digital lien service software determines said construction lien law documentation package based on lien laws and the business practices of the contractee; and wherein said lien laws are based on one or more of: a location of the new project, a legal residence of the contractee, and an agreed upon place of contracting.

* * * * *